United States Patent [19]

Reid

[11] Patent Number: 5,128,022
[45] Date of Patent: Jul. 7, 1992

[54] ANTIOXIDANT COMPOSITIONS AND METHODS USING P-PHENYLENEDIAMINE COMPOUNDS AND ORGANIC ACID COMPOUNDS

[75] Inventor: Dwight K. Reid, Houston, Tex.

[73] Assignee: Betz Laboratories, Inc., Trevose, Pa.

[21] Appl. No.: 644,066

[22] Filed: Jan. 18, 1991

[51] Int. Cl.⁵ .......................... C10B 9/16; C09K 15/18
[52] U.S. Cl. .................................. 208/48 AA; 507/90
[58] Field of Search ..................... 208/48 AA; 252/8.3

[56] References Cited

U.S. PATENT DOCUMENTS

| | | | |
|---|---|---|---|
| 3,907,745 | 9/1975 | Bsharah et al. | 260/45.9 |
| 4,061,545 | 12/1977 | Watson | 203/9 |
| 4,466,905 | 8/1984 | Butler et al. | 252/403 |
| 4,720,566 | 1/1988 | Martin | 588/306 |
| 4,775,458 | 10/1988 | Forester | 208/48 AA |
| 4,927,519 | 5/1990 | Forester | 208/48 AA |
| 4,929,778 | 5/1990 | Roling | 585/3 |

*Primary Examiner*—Theodore Morris
*Assistant Examiner*—P. L. Hailey
*Attorney, Agent, or Firm*—Alexander D. Ricci; Philip H. Von Neida

[57] ABSTRACT

Methods and compositions are provided for inhibiting the formation of polymers in petroleum or petrochemical processes that subsequently foul heat transfer surfaces. The compositions comprise a combination of N-Phenyl-N'-(1,3-dimethylbutyl)-p-phenylenediamine (PDA) and an organic acid. The methods comprise adding from 1 to 2500 ppm PDA and 1 to 3500 ppm organic acid to the system experiencing the fouling problem.

10 Claims, No Drawings

ANTIOXIDANT COMPOSITIONS AND METHODS USING P-PHENYLENEDIAMINE COMPOUNDS AND ORGANIC ACID COMPOUNDS

FIELD OF THE INVENTION

This invention relates to antioxidant compositions and methods of use in petroleum and petrochemical processes to reduce and/or control the formation of undesired polymers which foul equipment surfaces. The inventive antioxidant compositions are comprised of p-phenylenediamine compounds and organic acid compounds.

BACKGROUND OF THE INVENTION

Fouling can be defined as the accumulation of unwanted matter on heat transfer surfaces. This deposition can be very costly in refinery and petrochemical plants since it increases fuel usage, results in interrupted operations and production losses and increases maintenance costs.

Deposits are found in a variety of equipment: preheat exchangers, overhead condensers, furnaces, heat exchangers, fractionating towers, reboilers, compressors and reactor beds. These deposits are complex but they can be broadly characterized as organic and inorganic. They consist of metal oxides and sulfides, soluble organic metals, organic polymers, coke, salt, and various other particulate matter. Chemical antifoulants have been developed that effectively combat fouling.

The chemical composition of organic foulants is rarely identified completely. Organic fouling is caused by insoluble polymers which sometimes are degraded to coke. The polymers are usually formed by reactions of unsaturated hydrocarbons, although any hydrocarbon can polymerize. Generally, olefins tend to polymerize more readily than aromatics, which in turn polymerize more readily than paraffins. Trace organic materials containing hetero atoms such as nitrogen, oxygen and sulfur also contribute to polymerization.

Polymers are generally formed by free radical chain reactions. These reactions, shown below, consist of two phases, an initiation phase and a propagation phase. In Reaction 1, the chain initiation reaction, a free radical represented by R·, is formed (the symbol R· can be any hydrocarbon). These free radicals, which have an odd electron, act as chain carriers. During chain propagation, addition free radicals are formed and the hydrocarbon molecules (R) grow larger and larger (see Reaction 4), forming the unwanted polymers which accumulate on heat transfer surfaces.

Chain reactions can be triggered in several ways. In Reaction 1, heat starts the chain. Example: When a reactive molecule such as an olefin or a diolefin is heated, a free radical is produced. Another way a chain reaction starts is shown in Reaction 3. Metal ions initiate free radical formation here. Accelerating polymerization by oxygen and metals can be seen by reviewing Reactions 2 and 3.

As polymers form, more polymers begin to adhere to the heat transfer surfaces. This adherence results in dehydrogenation of the hydrocarbon and eventually the polymer is converted to coke.

1. Chain Initiation

R—H ··· R· + H·

2. Chain Propagation a. R· + $O_2$ ··· R—O—O·
    b. R—O—O· + R'—H ··· R· + R—O—O—H 3. Chain Initiation a. $Me^{--}$ + RH ··· $Me^+$R· + $H^+$
    b. $Me^{++}$ + R—O—O—H ··· $Me^+$R—O—O· + $H^+$ 4. Chain Termination a. R· + R· ··· R—R'
    b. R· + R—O—O· ··· R—O—O—R In refineries, deposits usually contain both organic and inorganic compounds. This makes the identification of the exact cause of fouling extremely difficult. Even if it were possible to precisely identify every single deposit constituent, this would not guarantee uncovering the cause of the problem. Assumptions are often erroneously made that if a deposit is predominantly a certain compound, then that compound is the cause of the fouling. In reality, oftentimes a minor constituent in the deposit could be acting as a binder, a catalyst, or in some other role that influences actual deposit formation.

The final form of the deposit as viewed by analytical chemists may not always indicate its origin or cause. Before openings, equipment is steamed, waterwashed, or otherwise readied for inspection. During this preparation, fouling matter can be changed both physically and chemically. For example, water-soluble salts can be washed away or certain deposit constituents oxidized to another form.

In petrochemical plants, fouling matter is often organic in nature. Fouling can be severe when monomers convert to polymers before they leave the plant. This is most likely to happen in streams high in ethylene, propylene, butadiene, styrene and other unsaturates. Probable locations for such reactions include units where the unsaturates are being handled or purified, or in streams which contain these reactive materials only as contaminants.

Even through some petrochemical fouling problems seem similar, subtle differences in feedstock, processing schemes, processing equipment and type of contaminants can lead to variations in fouling severity. For example, ethylene plant depropanizer reboilers experience fouling that appears to be primarily polybutadiene in nature. The severity of the problem varies significantly from plant to plant, however. The average reboiler run length may vary from one to two weeks up to four to six months (without chemical treatment).

Although it is usually impractical to identify the fouling problem by analytical techniques alone, this information combined with knowledge of the process, processing conditions and the factors known to contribute to fouling, are all essential to understanding the problem.

There are many ways to reduce fouling both mechanically and chemically. Chemical additives often offer an effective anti-fouling means; however, processing changes, mechanical modifications equipment and other methods available to the plant should not be overlooked.

Antifoulant chemicals are formulated from several materials: some prevent foulants from forming, others prevent foulants from depositing on heat transfer equipment. Materials that prevent deposit formation include antioxidants, metal coordinators and corrosion inhibitors. Compounds that prevent deposition are surfactants which act as detergents or dispersants. Different combinations of these properties are blended together to maximize results for each different application. These "polyfunctional" antifoulants are generally more versatile and effective since they can be designed to combat various types of fouling that can be present in any given system.

Research indicates that even very small amounts of oxygen can cause or accelerate polymerization. Accordingly, anti-oxidant-type antifoulants have been developed to prevent oxygen from initiating polymerization. Antioxidants act as chain-stoppers by forming inert molecules with the oxidized free radical hydrocarbons, in accordance with the following reaction:

Chain Termination
ROO.Antioxidant ---ROOH + Antioxidant (H)

Surface modifiers or detergents change metal surface characteristics to prevent foulants from depositing. Dispersants or stabilizers prevent insoluble polymers, coke and other particulate matter from agglomerating into large particles which can settle out of the process stream and adhere to the metal surfaces of process equipment. They also modify the particle surface so that polymerization cannot readily take place.

Antifoulants are designed to prevent equipment surfaces from fouling. They are not designed to clean up existing foulants. Therefore, an antifoulant should be started immediately after equipment is cleaned. It is usually advantageous to pretreat the system at double the recommended dosage for two or three weeks to reduce the initial high rate of fouling immediately after startup.

The increased profit possible with the use of antifoulants varies from application to application. It can include an increase in production, fuel savings, maintenance savings and other savings from greater operating efficiency.

There are many areas in the hydrocarbon processing industry where antifoulants have been used extensively; the main areas of treatment are discussed below.

In a refinery, the crude unit has been the focus of attention because of increased fuel costs. Antifoulants have been successfully applied at the exchangers; downstream and upstream of the desalter, on the product side of the preheat train, on both sides of the desalter makeup water exchanger and at the sour water stripper.

Hydrodesulfurization units of all types experience preheat fouling problems. Among those that have been successfully treated are reformer pretreater processing both straight run and coker naphtha, desulfurizers processing catalytically cracked and coker gas oil, and distillate hydro-treaters. In one case, fouling of a Unifiner stripper column was solved by applying a corrosion inhibitor upstream of the problem source.

Unsaturated and saturated gas plants (refinery vapor recovery units) experience fouling in the various fractionation columns, reboilers and compressors. In some cases, a corrosion control program combined with an antifoulant program gave the best results. In other cases, an application of antifoulants alone was enough to solve the problem.

Cat cracker preheat exchanger fouling, both at the vacuum column and at the cat cracker itself, has also been corrected by the use of antifoulants.

The two most prevalent areas for fouling problems in petrochemical plants are at the ethylene and styrene plants. In an ethylene plant, the furnace gas compressors, the various fractionating columns and reboilers are subject to fouling. Polyfunctional antifoulants, for the most part, have provided good results in these areas. Fouling can also be a problem at the butadiene extraction area. Both antioxidants and polyfunctional antifoulants have been used with good results.

In the different design butadiene plants, absorption oil fouling and distillation column and reboiler fouling have been corrected with various types of antifoulants.

Chlorinated hydrocarbon plants, such as VCM, EDC and perchlorethane and tri-chlorethane have all experienced various types of fouling problems. The metal coordinating/antioxidant-type antifoulants give excellent service in these areas.

SUMMARY OF THE INVENTION

This invention relates to a method and composition for controlling the formation of polymers in petroleum or petrochemical processing systems which comprises an antioxidant composition comprising a p-phenylenediamine compound and an organic acid such as citric acid. More particularly, this invention relates to a method and composition for controlling the formation of polymers and the subsequent fouling of equipment surfaces in petroleum or petrochemical processing systems which comprises an antioxidant composition comprising N-phenyl-N'-(1,3-dimethylbutyl)-p-phenylenediamine and citric acid. This invention is particularly effective at inhibiting the polymerization of butylacrylate monomers.

DESCRIPTION OF THE RELATED ART

Butler et al. U.S. Pat. No. 4,466,905, teaches a polymer inhibiting composition and process for inhibiting the polymerization of vinyl aromatic compounds. This patent teaches the use of a co-inhibitor composition during the heating of vinyl aromatic compounds. The co-inhibitors comprise 2,6-dinitro-p-cresol (DNPC) and a phenylenediamine compound. This composition and process must employ the addition of oxygen to the distillation system to work properly.

Bsharah et al. U.S. Pat. No. 3,907,745, teaches a synergistic antioxidant system for use in polymer system susceptible to oxidation. This system comprises a combination of an antioxidant such as a phenylenediamine and a chelating agent or metal deactivator such as a polyamine. This combination is directed for use in natural rubber and synthetic rubber-like polymer systems.

Martin U.S. Pat. No. 4,720,566, teaches compositions and methods for inhibiting acrylonitrile polymerization in quench columns of acrylonitrile producing systems. The composition comprises a hydroxylamine and a phenylenediamine compound.

Roling U.S. Pat. No. 4,929,778, teaches compositions and methods for inhibiting the polymerization of vinyl aromatic monomers during the preparation of monomers and the storage and shipment of products containing such monomers. The composition comprises a phenylenediamine compound and a hindered phenol compound jointly to inhibit polymerization of a vinyl aromatic monomer such as styrene.

Watson U.S. Pat. No. 4,061,545, teaches a process for the distillation of readily polymerizable vinyl aromatic compounds while reducing the amount of polymerized material in the distillation apparatus. The process utilizes a combination of phenothiazine and tertiarybutylcatechol in the presence of oxygen during the distillation of a vinyl aromatic compound such as styrene.

DETAILED DESCRIPTION OF THE INVENTION

This invention relates to a method and composition for controlling the formation of polymers in petroleum or petrochemical processing systems which comprises p-phenylenediamine and an organic acid such as citric acid. More particular, this invention relates to a method and composition for controlling the formation of polymers and the subsequent fouling of equipment surfaces in petroleum or petrochemical processing systems particularly heat exchanger transfer lines which comprises an antioxidant composition comprising N-phenyl-N'-(1,3-dimethylbutyl)-p-phenylenediamine and citric acid.

The use of amine compounds is known in the petroleum refining industry as antioxidants in hydrocarbon processing. Surprisingly, the present inventors have discovered that a combination of N-phenyl-N'-(1,3-dimethylbutyl)-p-phenylenediamine (PDA) and an organic acid works effectively well at controlling the formation of polymers during the processing of hydrocarbons. As compared with the earlier usage of amine compounds, this antioxidant works well as an antifoulant in hydrocarbons.

The inventors anticipate that any of the aromatic diamine antioxidants such as N-phenyl-N'-(1,4-dimethylpentyl)-p-phenylenediamine will also be effective in the invention.

The inventors also anticipate that any organic acid with carbon atoms ranging from $C_1$ to $C_6$ such as acetic, propionic and butyric acids will also be effective in the invention. Also contemplated to be effective are benzoic and naphthanoic acids.

The treatment range of the PDA and organic acid composition is dependent upon the severity of the fouling problem due to free radical polymerization encountered as well as the activity of the p-phenylenediamine compound and organic acid utilized. For this reason, the success of the treatment is totally dependent upon the use of a sufficient amount of the treatment composition.

Preferably, the total amount of p-phenylenediamine is from about 1 ppm to about 2500 ppm based upon the weight of the polymers formed. The organic acid is from about 1 ppm to about 3500 ppm based upon the weight of the polymers formed. Most preferably, the PDA is added from about 25 ppm to about 250 ppm. The organic acid is added from about 5 ppm to about 50 ppm.

The combined PDA and organic acid compound may be added to the desired system in a range expressed as percent composition of from about 10% to about 25 % by weight active for the PDA and from about 2% to about 5% by weight active for the organic acid. Preferably, the composition comprises 20% PDA by weight active and 4% citric acid by weight active, or in a ratio of 5 parts PDA to 1 part organic acid.

EXAMPLES

The invention will now be further described with reference to a number of specific examples which are to be regarded solely as illustrative, and not as restricting the scope of the invention.

TEST METHOD UTILIZED

The test method utilized measures the amount of polymer formed in a hydrocarbon medium. 30 ml of butylacrylate is refluxed along with the treatment agents under a constant flow of nitrogen gas for 2 hours.

A 100 ml of graduated centrifuge tube is prepared and 70 ml of cold methanol is added. The refluxed butylacrylate is then added to the tube and the tube is shaken well. The tube is then centrifuged for 5 minutes.

The amount of poly(butylacrylate) is then measured in ml by reading the markings of the graduated centrifuge tube. A low reading of the polymer formed is indicative of an effective inhibition treatment. The results of the test employing PDA and citric acid are presented below in Table I.

TABLE I

| Treatment | Weight Ratio | ppm/active | Gas used | Polymer Formed (ml) |
|---|---|---|---|---|
| Control | — | — | $N_2$ | 25.0 |
| PDA | — | 250 | $N_2$ | 0.3 |
| PDA/CA | (1:1) | 250 | $N_2$ | Trace |
| PDA/CA | (3:2) | 250 | $N_2$ | Trace |
| PDA | — | 100 | Air | 0.2 |
| PDA/CA | (1:1) | 100 | Air | 0.2 |
| PDA | — | 100 | $N_2$ | 0.75 |
| PDA/CA | (1:1) | 100 | $N_2$ | 0.2 |
| PDA/CA | (3:2) | 100 | $N_2$ | 0.1 |
| Control | — | — | $N_2$ | 25.0 |
| PDA | — | 100 | $N_2$ | 0.6 |
| PDA/CA | (1:1) | 100 | $N_2$ | Trace |
| PDA/CA | (1:1) | 50 | $N_2$ | Trace |
| CA | — | 50 | $N_2$ | 23.0 |
| Control | — | — | $N_2$ | 25.0 |
| PDA/CA | | 25 | $N_2$ | Trace |
| PTZ | — | 25 | $N_2$ | Trace |

PDA = N-phenyl-N'-(1,3-dimethylbutyl)-p-phenylenediamine
CA = Citric Acid
Trace = Less than 0.1 ml
PTZ = phenothiazine

DISCUSSION

As seen in Table I, a synergistic combination of PDA and CA acted effectively at inhibiting poly(butylacrylate) formation. This proved effective over a range of 25 to 250 ppm active. PDA, when used alone, was somewhat less effective than the combination, while CA, used alone, was completely ineffective. Phenothiazine, a known antioxidant was tested for comparison.

While this invention has been described with respect to particular embodiments thereof, it is apparent that numerous other forms and modifications of this invention will be obvious to those skilled in the art.

Having thus described the invention what we claim is:

1. A method for controlling the formation of polymers and the subsequent fouling of equipment surfaces in petroleum or petrochemical processing systems comprising adding an effective amount to said systems an antioxidant system comprising a p-phenylenediamine compound and an organic acid compound with carbon atoms ranging from $C_1$ to $C_6$.

2. A method as claimed in claim 1 wherein said p-phenylenediamine compound is N-Phenyl-N'-(1,3-dimethylbutyl)-p-phenylenediamine.

3. A method as claimed in claim 1 wherein said p-phenylenediamine compound is N-Phenyl-N'-(1,4-dimethylbutyl)-p-phenylenediamine.

4. A method as claimed in claim 1 wherein said organic acid compound is acetic acid.

5. A method as claimed in claim 1 wherein said organic acid compound is propionic acid.

6. A method as claimed in claim 1 wherein said organic acid is butyric acid.

7. A method as claimed in claim 1 wherein said organic acid is benzoic acid.

8. A method as claimed in claim 1 wherein said organic acid is naphthanoic acid.

9. A method as claimed in claim 1 wherein said equipment surfaces are heat exchanger transfer lines.

10. A method as claimed in claim 1 wherein said organic acid compound is citric acid.

* * * * *